United States Patent

Hikata et al.

[11] Patent Number: 5,643,840
[45] Date of Patent: Jul. 1, 1997

[54] LOW TEMPERATURE SEALING COMPOSITION WITH REDUCED $SiO_2$ CONTENT BUT

[75] Inventors: Hajime Hikata; Yoshitaka Jimura; Kumi Tanaka, all of Shiga-ken, Japan

[73] Assignee: Nippon Electric Glass Co., Ltd., Otsu, Japan

[21] Appl. No.: 583,134

[22] Filed: Dec. 28, 1995

[30] Foreign Application Priority Data

Dec. 29, 1994 [JP] Japan .................... 6-338841

[51] Int. Cl.$^6$ .................... C03C 8/14; C03C 3/072
[52] U.S. Cl. .................... 501/18; 501/15; 501/17; 501/32; 501/75; 501/76
[58] Field of Search .................... 501/75, 76, 15, 501/17, 18, 32

[56] References Cited

U.S. PATENT DOCUMENTS

| | | | |
|---|---|---|---|
| 4,006,028 | 2/1977 | Nofziger | 501/76 |
| 4,115,132 | 9/1978 | Suzuki et al. | 501/76 |
| 4,310,357 | 1/1982 | Matsuura et al. | 501/15 |
| 4,365,021 | 12/1982 | Pirooz | 501/15 |
| 4,515,898 | 5/1985 | Davis et al. | 501/15 |
| 4,522,925 | 6/1985 | Pirooz | 501/165 |
| 5,281,561 | 1/1994 | Dumesnil et al. | 501/17 |
| 5,284,706 | 2/1994 | O'Donnelly | 501/17 |
| 5,346,863 | 9/1994 | Hikata et al. | 501/17 |
| 5,510,300 | 4/1996 | Lim et al. | 501/18 |
| 5,534,469 | 7/1996 | Hayashi | 501/15 |
| 5,578,533 | 11/1996 | Manabe et al. | 501/17 |

OTHER PUBLICATIONS

M.B. Volf, Chemical Approach to Glass, Glass Science and Technology 7, Elsevier 1984, pp. 406–409.

*Primary Examiner*—Karl Group
*Assistant Examiner*—Louis M. Troilo
*Attorney, Agent, or Firm*—Gollard & Roe, P.C.

[57] ABSTRACT

A low temperature sealing composition comprising $PbO$—$B_2O_3$—$Bi_2O_3$ glass powder with a reduced amount of $SiO_2$ content but with an addition of $GeO_2$ so as to realize a lowered sealing temperature such as 400°–310° C. The glass powder consists essentially of 25–85 wt. % of $PbO$, 1–11.2 wt. % of $B_2O_3$, 5.1–70 wt. % of $Bi_2O_3$, 0.1–20 wt. % of $GeO_2$, 0–5 wt. % of $SiO_2$, 0–10 wt. % of $Fe_2O_3$, 0–10 wt. % of $CuO$, 0–15 wt. % of $ZnO$, 0–5 wt. % of $TiO_2$, and 0–9 wt. % of $F_2$. The glass powder may be used by mixing with 15–55 vol. % of refractory filler powder of at least one element which is selected from the group consisting of lead titanate based ceramic powder, willemite based ceramic powder, cordierite ceramic powder, zircon based ceramic powder, tin oxide solid solution powder, and alumina powder.

15 Claims, No Drawings

LOW TEMPERATURE SEALING COMPOSITION WITH REDUCED SIO₂ CONTENT BUT

BACKGROUND OF THE INVENTION

The present invention relates to a low temperature sealing composition and, in particular, to such a low temperature sealing composition suitable for hermetically sealing a ceramic package for containing integrated circuits (ICs), quartz resonators, and others, and sealing electric and electronic devices such as liquid-crystal displays.

The sealing composition of the type as described above is required to be sealable at a low temperature so as not to deteriorate ICs, quarts, electronic devices due to thermal effects. It is also required to have the thermal coefficient of expansion compatible with that of the ceramic packages, display glass panels of the displays, and others to be sealed. Further, it is also required to have superior insulating roperties to avoid undesirable leak of, and high in mechanical strength, and excellent in weather resistance such as moistrue resistance. The sealing composition for packages containing ICs is further required to possibly reduce α-ray radiation element because α-ray radiation causes soft errors in ICs such as DRAM and CCD.

In the prior art, a sealing glass composition of PbO—$B_2O_3$—$Bi_2O_3$—$SiO_2$ is disclosed in, for example, U.S. Pat. No. 5,346,863, as a typical composition meeting the above-mentioned requirements. The glass Composition can be used as a mixture with refractory filler powder. The glass composition has a sealing temperature of about 400° C. or lower.

In use, the sealing composition is mixed with plastic resin and organic solvent to form a paste. The paste is printed onto zeal potions of parts to be sealed and is heated to burn out the organic solvent and then to complete the seal.

In recent ICs, increased integration leads low heat resistance of ICs. Therefore, the demand is directed to a sealing composition with a lowered sealing temperature.

In connection with the PbO—$B_2O_3$—$Bi_2O_3$—$SiO_2$ sealing glass composition, it is known in the art that the sealing temperature is lowered by reduction of $SiO_2$ content. However, reduction of $SiO_2$ content results in surface activation of the glass particles, and the glass particles are, therefore, strongly connected or adhered with the plastic resin in the paste. Accordingly, the plastic resin is hardly decomposed in the heat treatment so that the heated seal layer often includes bubbles or voids therein and/or is often darkened in appearance. The bubbles deteriorate the seal strength. On the other hand, the darkness is considered to be caused by presence of Pb metal colloid through reduction of PbO in the glass by the non-decomposed residue of the plastic resin, which disadvantageously causes deterioration of the strength and electric insulation of the glass seal. This means that the sealing glass composition should contain an amount of $SiO_2$ so as to avoid the bubbles and darkness. As a result, it is limited for the sealing glass composition of the type to have a lowered sealing temperature.

SUMMARY OF THE INVENTION

It is an object of the present invention to provide a sealing composition with a lowered sealing temperature by decreasing $SiO_2$ content but without presence of bubbles and darkness.

According to the present invention, a low temperature sealing composition can be obtained which consists of glass powder consisting essentially of 25–85 wt. % of PbO, 1–11.2 wt. % of $B_2O_3$, 5.1–70 wt. % of $Bi_2O_3$, 0.1–20 wt. % of $GeO_2$, 0–5 wt. % of $SiO_2$, 0–10 wt. % of $Fe_2O_3$, 0–10 wt. % of CuO, 0–15 wt. % of ZnO, 0–5 wt. % of $TiO_2$, and 0–9 wt. % of $F_2$.

The glass composition can be used, as a mixture, together with a refractory filler of 15–55 vol. %. The refractory filler powder may be at least one element which is selected from the group consisting of lead titanate based ceramic powder, willemite based ceramic powder, cordierite ceramic powder, zircon based ceramic powder, tin oxide solid solution ceramic powder, and alumina ceramic powder.

DESCRIPTION OF THE INVENTION

Briefly stated, the present invention is based on a novel knowledge by the present inventors that addition of $GeO_2$ can suppress the surface activation of the glass particles with $SiO_2$ content being decreased to lower the sealing temperature.

In the low temperature sealing composition according to the present invention, the ingredients of the glass powder are limited as set forth above because of the following reasons.

The content of PbO ranges from 25.0 to 85 wt. %, preferably 40–85 wt. %, and more preferably 50–80 wt. %. PbO content less than 40 wt. % increases the viscosity of the glass, with the viscosity being excessively high at the content less than 25 wt. % so that the glass results in insufficient flowability at a temperature of about 400° C. or lower. On the other hand, PbO content more than 85 wt. % causes crystallization upon sealing to thereby make the sealing difficult at a low temperature of about 400° C. or lower.

The content of $B_2O_3$ ranges from I to 11.2 wt. %, preferably 1.5–11.1 wt. % and more preferably 2–8.5 wt. %. $B_2O_3$ is an element for stabilizing the glass but causes crystallization by use of less than 1.5 wt. %. $B_2O_3$ content less than 1 wt. % results in a considerable amount of crystals precipitated so that the sealing is impossible at a low temperature such as 400° C. or lower. On the other hand, $B_2O_3$ content more than 11.1wt. % increases the viscosity of the glass, and the content more than 11.2 wt. % makes the sealing difficult at a low temperature such as 400° C. or lower.

$Bi_2O_3$ has an effect for increasing vitrification to stabilize the glass without increasing the viscosity. Its content is 5.1 wt. % to 70 wt. %, preferably 5.1 wt. % to 45 wt. %, and more preferably 5.1 wt. % to 30 wt. %. $Bi_2O_3$ content less than 5.1 wt. % decreases the effect end further increases crystallization to make it difficult to seal at a low temperature such as 400° C. or lower, especially in the glass composition including $B_2O_3$ content less than 7 wt. %. On the other hand, $Bi_2O_3$ more than 45 wt. % causes to increase the viscosity of the glass while content more than 70 wt. % makes the low temperature sealing difficult.

$GeO_2$ is contained by 0.1 wt. % to 20 wt. %, preferably 0.1 wt. % to 10 wt. %, and more preferably 0.1 wt. % to 5 wt. %. $GeO_2$ is a glass forming element, and it stabilizes the glass, realizes a lowered melting point and increases stability of the glass surface, in even use of a content smaller than $SiO_2$ by the molecular ratio. However, $GeO_2$ less than 0.1 wt. % has no effect and therefore, the resultant glass particles tend to absorb water onto the surface to thereby produce bubbles and darkness in the sealed glass after sealing operation, if the resultant glass also has a reduced Mount of $SiO_2$ for lowering the melting point. $GeO_2$ more than 10 wt. % increases the viscosity of the glass and the sealing cannot be realized at a low temperature such as 400° C. or lower when exceeds 20 wt. %.

$SiO_2$ is for stabilizing the glass and can be contained by 0 wt. % to 5 wt. %, preferably Up to 2 wt. %, and more preferably up to 0.4 wt. %. When $SiO_2$ content is more than 2 wt. %, the glass transformation point is raised. When it exceeds 5 wt. %, the sealing is not possible at a low temperature such as 400° C. or lower. In the present invention, $SiO_2$ content should be reduced as low as possible so as to lower the melting point.

$Fe_2O_3$ and CuO are for stabilizing the glass and each of them is contained by 0 wt. % to 10 wt. %, preferably up to 7 wt. %, and more preferably up to 4 wt. %. The content more than 7 wt. % causes increase of viscosity. When it exceeds 10 wt. %, the sealing is not possible at a low temperature such as 400° C. or lower. A total amount of $Fe_2O_3$ and CuO is 0.2 wt. % to 15 wt. %, preferably 0.5 wt. % to 7 wt. %.

ZnO is contained by 0 wt. % to 15 wt. %, preferably up to 14 wt. %, and more preferably 0.1 wt. % to 6 wt. %, so as to stabilize the glass and improve the moisture resistance. The content more than 14 wt. % causes crystallization. When it exceeds 15 wt. %, the glass is crystallized to inhibit sufficient flow of the glass.

$TiO_2$ is contained by 0 wt. % to 5 wt. %, preferably up to 2 wt. %, and more preferably up to 1.5 wt. %, so as to stabilize the glass. The content more than 2 wt. % causes crystallization. When it exceeds 5 wt. %, the glass is crystallized to inhibit sufficient flow of the glass.

$F_2$ is an element which is used in a glass composition containing a relatively large amount of $Bi_2O_3$ for lowering the glass set temperature and suppressing the crystallization. In the glass composition of the present invention, its content is 0 wt. % to 9 wt. %, preferably up to 8 wt. %, and more preferably up to 5 wt. %. The content more than 8 wt. % causes crystallization. When it exceeds 9 wt. %, the glass is crystallized to inhibit sufficient flow of the glass.

The glass composition of the present invention can contain one or more of $Al_2O_3$, $V_2O_5$, AgO, SrO, $P_2O_5$, $Co_2O_3$, and $TeO_2$, each up to 5 wt. %, and also one or more of $Mo_2O_3$, $Rb_2O$, $Cs_2O$, $Nb_2O_5$, $Ta_2O_3$, $CeO_2$, NiO, $Cr_2O_3$, $As_2O_3$, $Sb_2O_3$, $SnO_2$, and rare earth metal oxide such as $La_2O_3$, each up to 3 wt. %. However, toxic elements such as $Tl_2O$ and CdO should not be used so as to avoid the pollution.

The glass composition according to the present invention is amorphous or vitreous, and hardly precipitates crystals to sufficiently flow during the sealing operation. The glass composition has a low glass transformation point such as 310° C. and a low viscosity, and therefore, is useful as a low temperature sealing composition. The glass composition has a thermal coefficient of expansion of $100 \times 10^{-7}$/°C. over a temperature range of 30°–200° C., and therefore, can be used for sealing parts of materials having a relatively high thermal coefficient of expansion compatible with that of the glass composition.

However, it is possible to adjust the thermal coefficient of expansion (TCE) of the glass composition by mixing with refractory filler powders when the glass composition is used for sealing the IC packages or display glass panels made of materials having the TCE which is not compatible with that of the glass composition, for example, alumina having the TCE of $70 \times 10^{-7}$/°C., aluminum nitride having the TCE of $45 \times 10^{-7}$/°C., and display glass panel having the TCE of $85 \times 10^{-7}$/°C.

When the glass composition is mixed with the refractory filler, the former should be 45–85 vol. % while the latter is 15–55 vol. %. The use of refractory filler less than 15 vol. % is meaningless and cannot sufficiently adjust the TCE. On the contrary, when it exceeds 55 vol. %, the flow of the glass is insufficient for sealing at a low temperature such as 400° C. or lower.

As the refractory filler powder, one or more can be used which are selected from, preferably, lead titanate based ceramic powder, willemite based ceramic powder, cordierite ceramic powder, zircon based ceramic powder, tin oxide solid solution ceramic powder, and alumina ceramic powder. As other fillers, there can be used titanium oxide, niobium pentoxide, and mullite. β-eucryptite is useless because it lowers flowability of the glass as well as it lowers electric insulation resistance of the glass composition due to its alkali metal content.

Examples according to the present invention will be described below.

EXAMPLE 1

This example is for demonstrating effects of $SiO_2$ and $GeO_2$ for lowering the melting point and for decomposition of the plastic resin. The glass transformation point and the decomposition of plastic resin were measured in connection with three test samples a, b, and c and were shown in TABLE 1.

TABLE 1

| Samples | (wt. %) | | |
|---|---|---|---|
| | a | b | c |
| PbO | 64.0 | 64.0 (64.6) | 64.0 |
| $B_2O_3$ | 7.5 | 7.5 (7.6) | 7.5 |
| $Bi_2O_3$ | 18.0 | 18.0 (18.2) | 18.0 |
| $GeO_2$ | — | — (—) | 1.0 |
| $SiO_2$ | 1.0 | — (—) | — |
| CuO | 3.5 | 3.5 (3.5) | 3.5 |
| ZnO | 6.0 | 6.0 (6.1) | 6.0 |
| Sum | 100 | 99 (100) | 100 |
| Glass Transformation Point (°C.) | 307 | 292 | 296 |
| Decomposition of Plastic Resin | good | no good | good |

Test sample a is one of $PbO$—$B_2O_3$—$Bi_2O_3$—$SiO_2$ glass compositions, test sample b is $PbO$—$B_2O_3$—$Bi_2O_3$ glass composition where $SiO_2$ is omitted from test sample a, and test sample c is a sample where 1 wt. % $GeO_2$ is added to test sample b.

In the column of sample b in table 1, the amounts of the ingredients of sample a with $SiO_2$ omitted therefrom are described and further amounts of the ingredients converted to a sum of 100 wt % are also described with parentheses.

Those test samples a, b, and c were prepared by blending and mixing raw materials to obtain each mixture of compositions a, b, and c shown in TABLE 1, melting the mixtures at 900° C. for one hour in a platinum crucible, forming a plate, grinding the plate, and sieving through a 350-mesh stainless steel screen to obtain glass powder having an average particle size of 4 μm.

Then, the obtained glass powder of each of the test samples a, b, and c was subjected to evaluation tests of the glass transformation point and the decomposition of plastic resin.

The glass transformation point was measured by use of a differential thermal analyzer (DTA).

For the plastic decomposition test, the glass powder of each test sample was mixed with willemite ceramic powder of 40 vol. % to adjust the TCE over a temperature range of 30°–200° C. to 67–73×10$^{-7}$/°C. compatible with that of alumina which is 70×10$^{-7}$/°C.

The mixture powder was mixed with a vehicle comprising acrylate resin of 5 wt. % dissolved An terpineol and thereby a paste was formed. The paste was printed to form a film with a predetermined thickness onto a surface of alumina for a ceramic dual inline package (CERDIP). It was then heated to a temperature higher by 80° C. than the glass transformation temperature so as to decompose the binder and was, thereafter, sintered at a sealing temperature. The sintered glass film layer was observed, and the decomposition of plastic resin was evaluated to be "no good" when the glass layer was darkened more than the layer before being sintered and/or when it included bubbles more than that before being sintered. Otherwise, it was evaluated "good".

From TABLE 1, it is seen that test sample a has the glass transformation point of 307° C. and an excellent decomposition of plastic resin. Test sample b with SiO$_2$ omitted has the glass transformation point of 292° C. which is lower by 15° C. than that of test sample a but is inferior to test sample a in the decomposition of plastic resin. On the other hand, test sample c with GeO$_2$ has the glass transformation point of 296° C. which is lower by 11° C. than that of test sample a and is excellent in the decomposition of plastic resin.

This means that use of GeO$_2$ in place of SiO$_2$ can lower the melting point and realize a glass sealing composition having an excellent decomposition of plastic resin.

EXAMPLE 2

Thirteen (13) samples A–M of the present invention are shown in TABLE 2. Those samples A–M were prepared and subjected to the evaluation tests in the similar manner in Example 1. The TCE was measured for a sintered one of each sample by use of a dilatometer. The flowability was measured for glass buttons made of samples A–M, each having a diameter of 20 mm and a height of 5 mm. The flowability was determined "good" for buttons having an enlarged diameter larger than 21 mm after being heated at 380° C. for 10 minutes, while determined "no good" for buttons having a diameter of 21 mm or smaller after being heated.

It is seen from TABLE 2 that those samples A–M have the transformation point of 195°–310° C., the TCE of 102–162×10$^{-7}$/°C., and are excellent in the flowability and stability.

TABLE 2

| Samples | | A | B | C | D | E |
|---|---|---|---|---|---|---|
| Com- | PbO | 45.7 | 83.0 | 40.6 | 57.8 | 72.3 |
| posi- | B$_2$O$_3$ | 9.2 | 2.0 | 11.1 | 6.0 | 7.4 |
| tion | Bi$_2$O$_3$ | 40.1 | 5.3 | 45.0 | 5.2 | 9.4 |
| (wt. %) | GeO$_2$ | 4.0 | 1.0 | 0.3 | 7.0 | 1.5 |
| | SiO$_2$ | — | 0.3 | — | — | — |
| | Fe$_2$O$_3$ | 1.0 | 3.0 | — | 1.5 | — |
| | CuO | — | 1.0 | — | 1.5 | 6.2 |
| | ZnO | — | 4.4 | 2.0 | 13.0 | — |
| | TiO$_2$ | — | — | 1.0 | — | — |
| | F$_2$ | — | — | — | 8.0 | 3.2 |
| Glass Transformation Point (°C.) | | 310 | 294 | 310 | 210 | 252 |
| Thermal Coefficient of Expansion (× 10$^{-7}$/°C.) | | 105 | 111 | 102 | 162 | 141 |
| Stability | | good | good | good | good | good |
| Flowability | | good | good | good | good | good |

TABLE 2-continued

| Samples | | F | G | H | | |
|---|---|---|---|---|---|---|
| Com- | PbO | 65.1 | 64.2 | 66.2 | | |
| posi- | B$_2$O$_3$ | 8.1 | 5.9 | 3.8 | | |
| tion | Bi$_2$O$_3$ | 14.4 | 17.1 | 24.3 | | |
| (wt. %) | GeO$_2$ | 1.2 | 1.5 | 1.0 | | |
| | SiO$_2$ | — | — | 1.2 | | |
| | Fe$_2$O$_3$ | 5.2 | 3.2 | 1.2 | | |
| | CuO | — | 0.5 | 2.3 | | |
| | ZnO | 3.8 | 1.4 | — | | |
| | TiO$_2$ | — | — | — | | |
| | F$_2$ | 2.2 | 6.2 | — | | |
| Glass Transformation Point (°C.) | | 263 | 235 | 294 | | |
| Thermal Coefficient of Expansion (× 10$^{-7}$/°C.) | | 139 | 151 | 110 | | |
| Stability | | good | good | good | | |
| Flowability | | good | good | good | | |
| Samples | | I | J | K | L | M |
| Com- | PbO | 69.0 | 54.4 | 77.7 | 74.8 | 69.3 |
| posi- | B$_2$O$_3$ | 5.0 | 2.4 | 8.4 | 4.9 | 6.3 |
| tion | Bi$_2$O$_3$ | 19.3 | 27.0 | 7.0 | 13.2 | 14.6 |
| (wt. %) | GeO$_2$ | 3.8 | 0.3 | 1.3 | 0.8 | 0.3 |
| | SiO$_2$ | — | — | — | — | 0.1 |
| | Fe$_2$O$_3$ | 1.5 | 3.0 | 1.1 | 0.5 | 0.8 |
| | CuO | — | 3.2 | 1.1 | 2.0 | 1.6 |
| | ZnO | 0.3 | 5.0 | 2.2 | 2.0 | 4.5 |
| | TiO$_2$ | — | — | 1.2 | — | — |
| | F$_2$ | 0.3 | 4.7 | — | 1.8 | 2.5 |
| Glass Transformation Point (°C.) | | 298 | 195 | 292 | 266 | 242 |
| Thermal Coefficient of Expansion (× 10$^{-7}$/°C.) | | 105 | 151 | 108 | 126 | 132 |
| Stability | | good | good | good | good | good |
| Flowability | | good | good | good | good | good |

EXAMPLE 3

TABLE 3 shows various samples 1–21 of the low temperature sealing composition prepared by mixing refractory filler powder with sample glass powder A–M in TABLE 2. Samples 1–15 are for IC packages and other samples 16–21 are for fluorescent display tubes.

It is seen from TABLE 3 that samples 1–15 provides satisfactory properties: the sealing temperature of 410° C. or lower; package strength of 240 lbf.in or more; α-ray radiation of 0.23 count/cm$^2$.hr; electric insulation resistance of 10$^{9.2}$Ω.cm or more, end an excellent decomposition of plastic resin. The TCE over a temperature range of 30°–200° C. is 65–75×10$^{-7}$/°C. or samples 1–7, 12–14 and 15, while 51–54×10$^{-7}$/°C. for samples 8–11, which are compatible with the TCE, 70×10$^{-7}$/°C., of alumina and TCE, 45×10$^{-7}$/°C., of aluminum nitride, respectively.

It is also seen that samples 16–21 have properties satisfactory for display glass plates of fluorescent display tubes: the sealing temperature of 400° C. or lower; the electric insulation resistance of 10$^{13.1}$Ω.cm or higher; an excellent decomposition of plastic resin; and TCE over a temperature range of 30°–250° C. is 74–76×10$^{-7}$/°C. compatible with TCE, 85×10$^{-7}$/°C., of the display glass panel.

Accordingly, it will be noted from these facts that the low temperature sealing composition of the present invention meets various requirements for the sealing materials used to seal IC packages and display panels. Further, it is sealable at a low temperature such as 400° C. or lower and excellent in the decomposition of plastic resin.

The sealing temperature in TABLE 3 was determined as follows: each of sample glass powder was mixed with a vehicle, which is obtained by dissolving a low molecular weight acrylic resin in terpineol at a concentration of 5% to form a paste, and the paste was printed onto package parts and grazed, which were sintered at different temperatures. The sealing temperature was determined as the lowest temperature at which the sealing is possible.

TABLE 3

| Samples | 1 | 2 | 3 | 4 | 5 |
|---|---|---|---|---|---|
| Glass Powder (vol %) | A | B | C | D | E |
|  | 75 | 60 | 65 | 57 | 59 |
| Refractory Filler Powder (vol %) | | | | | |
| Lead Titanate Ceramic | 20 | — | 5 | — | 6 |
| Willemite Based Ceramic | — | — | — | 20 | — |
| Cordierite Ceramic | — | 30 | 20 | 15 | 30 |
| Zircon Based Ceramic | 5 | 10 | — | — | — |
| Tin Oxide Solid Solution | — | — | 10 | — | 5 |
| Sealed Object | Alumina | Alumina | Alumina | Alumina | Alumina |
| Sealing Temperature (°C.) | 410 | 400 | 400 | 320 | 350 |
| Strength of Package (lbf · in) | 270 | 270 | 250 | 290 | 270 |
| α-radiation (count/cm$^2$ · hour) | 0.13 | 0.12 | 0.15 | 0.17 | 0.11 |
| Electric Resistance (Ω · cm) | 12.7 | 12.8 | 13.1 | 10.3 | 10.6 |
| Decomposition of Plastic Resin | good | good | good | good | good |
| Thermal Coefficient of Expansion (× 10$^{-7}$/°C.) | 69 | 68 | 65 | 70 | 66 |

| Samples | 6 | 7 | 8 | 9 | 10 |
|---|---|---|---|---|---|
| Glass Powder (vol %) | F | G | B | G | H |
|  | 51 | 65 | 55 | 52 | 55 |
| Refractory Filler Powder (vol %) | | | | | |
| Lead Titanate Ceramic | 8 | 35 | 20 | 20 | 23 |
| Willemite Based Ceramic | 35 | — | 10 | — | 17 |
| Cordierite Ceramic | — | — | 15 | 15 | — |
| Zircon Based Ceramic | — | — | — | 9 | 5 |
| Tin Oxide Solid Solution | 6 | — | — | — | — |
| Sealed Object | Alumina | Alumina | Aluminum Nitride | Aluminum Nitride | Aluminum Nitride |
| Sealing Temperature (°C.) | 370 | 320 | 400 | 410 | 340 |
| Strength of Package (lbf · in) | 250 | 240 | 290 | 310 | 300 |
| α-radiation (count/cm$^2$ · hour) | 0.16 | 0.14 | 0.16 | 0.15 | 0.12 |
| Electric Resistance (Ω · cm) | 10.1 | 12.3 | 13.0 | 13.2 | 9.5 |
| Decomposition of Plastic Resin | good | good | good | good | good |
| Thermal Coefficient of Expansion (× 10$^{-7}$/°C.) | 67 | 75 | 52 | 52 | 54 |

| Samples | 11 | 12 | 13 | 14 | 15 |
|---|---|---|---|---|---|
| Glass Powder (vol %) | I | J | K | L | M |
|  | 55 | 55 | 60 | 58 | 62 |
| Refractory Filler Powder (vol %) | | | | | |
| Lead Titanate Ceramic | 15 | 15 | — | 8 | 15 |
| Willemite Based Ceramic | 10 | 20 | 20 | 34 | 18 |
| Cordierite Ceramic | 10 | — | — | — | — |
| Zircon Based Ceramic | 10 | — | 20 | — | 5 |
| Tin Oxide Solid Solution | — | 10 | — | — | — |
| Sealed Object | Aluminum Nitride | Alumina | Alumina | Alumina | Alumina |
| Sealing Temperature (°C.) | 400 | 310 | 390 | 370 | 340 |
| Strength of Package (lbf · in) | 300 | 250 | 280 | 240 | 240 |
| α-radiation (count/cm$^2$ · hour) | 0.09 | 0.11 | 0.23 | 0.08 | 0.14 |
| Electric Resistance | 13.0 | 9.2 | 13.4 | 10.1 | 11.1 |

TABLE 3-continued

| (Ω · cm) | | | | | |
|---|---|---|---|---|---|
| Decomposition of Plastic Resin | good | good | good | good | good |
| Thermal Coefficient of Expansion (× 10⁻⁷/°C.) | 51 | 75 | 68 | 69 | 74 |

| Samples | 16 | 17 | 18 |
|---|---|---|---|
| Glass Powder (vol %) | B | C | D |
| | 66 | 65 | 75 |
| Refractory Filler Powder (vol %) | | | |
| Lead Titanate Ceramic | 12 | 10 | 20 |
| Willemite Based Ceramic | — | 15 | — |
| Cordierite Ceramic | — | — | 5 |
| Zircon Based Ceramic | 22 | 10 | — |
| Sealed Object | Display Panel Glass | Display Panel Glass | Display Panel Glass |
| Sealing Temperature (°C.) | 390 | 400 | 390 |
| Electric Resistance (Ω · cm) | 13.1 | 13.5 | 13.2 |
| Decomposition of Plastic Resin | good | good | good |
| Thermal Coefficient of Expansion (× 10⁻⁷/°C.) | 76 | 76 | 76 |

| Samples | 19 | 20 | 21 |
|---|---|---|---|
| Glass Powder (vol %) | K | K | K |
| | 70 | 75 | 72 |
| Refractory Filler Powder (vol %) | | | |
| Lead Titanate Ceramic | — | 15 | — |
| Willemite Based Ceramic | — | — | 10 |
| Cordierite Ceramic | 20 | — | 22 |
| Zircon Based Ceramic | 10 | 10 | — |
| Sealed Object | Display Panel Glass | Display Panel Glass | Display Panel Glass |
| Sealing Temperature (°C.) | 390 | 380 | 390 |
| Electric Resistance (Ω · cm) | 13.3 | 13.2 | 13.2 |
| Decomposition of Plastic Resin | good | good | good |
| Thermal Coefficient of Expansion (× 10⁻⁷/°C.) | 74 | 75 | 75 |

The package strength was determined in a CERDIP having an LSI with 28 leads according to the so-called torque test. The torque test is performed by applying opposite rotational forces to a base ceramic and a cap ceramic of the CERDIP, and measuring by a torque meter, as the strength, the force at which the seal is broken.

The α-ray radiation was measured by use of a ZnS scintillation counter.

The electric insulation resistance was measured at 150° C. by use of a megohm meter.

The various refractory filler powder in TABLE 3 were prepared through the following procedures.

Lead titanate based ceramic (Which is only described as Lead titanate ceramic in Table 3) is one having CaO solid-solved in PbTiO$_3$ crystal. Raw materials such as litharge, titanium oxide, and calcium carbonate were blended to have the ratio of 70 wt. % PbO, 20 wt. % TiO$_2$ and 10 wt. % CaO, and were mixed, then sintered at 1,100° C. for 5 hours. The resultant sintered body was ground into powder by use of alumina balls. The powder was sieved through a 350-mesh stainless steel screen to obtain powder having the average particle size of 4 μm.

Willemite based ceramic powder was prepared by blending raw materials such as zinc flower, high purity quartz sand, and aluminum oxide into the ratio of 70 wt. % ZnO, 25 wt. % SiO$_2$ and 5 wt. % Al$_2$O$_3$. The blend was mixed, then sintered at 1,440° C. for 15 hours. The resultant sintered body was ground into powder by use of alumina balls. The powder was sieved through a 250-mesh stainless steel screen to obtain powder having the average particle size of 5 μm.

Cordierite ceramic powder as prepared by blending raw materials such as magnesium oxide, aluminum oxide, and high purity quartz sand into the ratio of 2MgO.2Al$_2$O$_3$.5SiO$_2$. The blend was mixed, then sintered at 1,400° C. for 10 hours. The resultant sintered body was ground into powder by use of alumina balls. The powder was sieved through a 250-mesh stainless steel screen to obtain the powder used.

Zircon based ceramic powder was prepared through the following processes. Natural Zircon sand was subjected to soda decomposition and the resultant product was dissolved in hydrochloride acid, following which concentration and crystallization were repeated, whereby obtaining zirconium oxychloride with extremely low content of α-ray radiation elements, i.e., uranium (U) and thorium (Th). The zirconium oxychloride was neutralized with an alkali and then heated, whereby obtaining purified zirconium oxide ($ZrO_2$). The purified zirconium oxide was mixed with high purity silica powder and ferric oxide to from a ratio of 66 wt. % $ZrO_2$, 32 wt. % $SiO_2$, and 2 wt. % $Fe_2O_3$. The mixture was sintered at 1400° C. for 16 hours. The resultant sintered body was ground into powder and sieved using a 250-mesh stainless steel screen to obtain the powder used.

Tin oxide solid solution ceramic powder (which is only described as Tin oxide solid solution in TABLE 3) was prepared by blending tin oxide, and manganese dioxide into the ratio of 99 wt. % $SnO_2$ and 1 wt. % $MnO_2$. The blend was mixed, then sintered at 1,400° C. for 16 hours. The resultant sintered body was ground into powder by use of alumina balls. The powder was sieved through a 250-mesh stainless steel screen to obtain the powder used.

The alumina powder was commercially available and was one which was sieved through a 250-mesh stainless steel screen.

As described above, the low temperature sealing composition of the present invention fulfills various properties and features required for the sealing materials to seal IC packages or display panels. It is sealable at a lowered temperature in comparison with the known composition end does not deteriorate packages because presence of bubbles and darkened appearance is not caused in the sealed layer after sintered. Accordingly, it is excellent as the materials for sealing electronic parts.

What is claimed is:

1. A low temperature sealing composition consisting of glass powder, said glass powder consisting essentially of 25–85 wt. % of PbO, 1–11.2 wt. % of $B_2O_3$, 5.1–70 wt. % of $Bi_2O_3$, 0.1–20 wt. % of $GeO_2$, 0–5 wt. % of $SiO_2$, 0–10 wt. % of $Fe_2O_3$, 0–10 wt. % of CuO, 0–15 wt. % of ZnO, 0–5 wt. % of $TiO_2$, and 0–9 wt. % of $F_2$.

2. A low temperature sealing composition as claimed in claim 1, wherein a total amount of $Fe_2O_3$ and CuO is 0.2–15 wt. %.

3. A low temperature sealing composition as claimed in claim 1, said glass powder consisting essentially of 40–85 wt. % of PbO, 1.5–11.1 wt. % of $B_2O_3$, 5.1–45 wt. % of $Bi_2O_3$, 0.1–10 wt. % of $GeO_2$, 0–2 wt. % of $SiO_2$, 0–7 wt. % of $Fe_2O_3$, 0–7 wt. % of CuO, 0–14 wt. % of ZnO, 0–2 wt. % of $TiO_2$, and 0–8 wt. % of $F_2$.

4. A low temperature sealing composition as claimed in claim 3, wherein a total amount of $Fe_2O_3$ and CuO is 0.5–7 wt. %.

5. A low temperature sealing composition as claimed in claim 1, said glass powder consisting essentially of 50–80 wt. % of PbO, 2–8.5 wt. % of $B_2O_3$, 5.1–30 wt. % of $Bi_2O_3$, 0.1–5 wt. % of $GeO_2$, 0–0.4 wt. % of $SiO_2$, 0–4 wt. % of $Fe_2O_3$, 0–4 wt. % of CuO, 0.1–6 wt. % of ZnO, 0–1.5 wt. % of $TiO_2$, and 0–5 wt. % of $F_2$.

6. A low temperature sealing composition as claimed in claim 5, wherein a total amount of $Fe_2O_3$ and CuO is 0.5–7 wt. %.

7. A low temperature sealing composition consisting of 45–85 vol. % of glass powder and 15–55 vol. % of refractory filler powder, said glass powder consisting essentially of 25–85 wt. % of PbO, 1–11.2 wt. % of $B_2O_3$, 5.1–70 wt. % of $Bi_2O_3$, 0.1–20 wt. % of $GeO_2$, 0–5 wt. % of $SiO_2$, 0–10 wt. % of $Fe_2O_3$, 0–10 wt. % of CuO, 0–15 wt. % of ZnO, 0–5 wt. % of $TiO_2$, and 0–9 wt. % of $F_2$.

8. A low temperature sealing composition as claimed in claim 7, said glass powder consisting essentially of 40–85 wt. % of PbO, 1.5–11.1 wt. % of $B_2O_3$, 5.1–45 wt. % of $Bi_2O_3$, 0.1–10 wt. % of $GeO_2$, 0–2 wt. % of $SiO_2$, 0–7 wt. % of $Fe_2O_3$, 0–7 wt. % of CuO, 0–14 wt. % of ZnO, 0–2 wt. % of $TiO_2$, and 0–8 wt. % of $F_2$.

9. A low temperature sealing composition as claimed in claim 7, said glass powder consisting essentially of 50–80 wt. % of PbO, 2–8.5 wt. % of $B_2O_3$, 5.1–30 wt. % of $Bi_2O_3$, 0.1–5 wt. % of $GeO_2$, 0–0.4 wt. % of $SiO_2$, 0–4 wt. % of $Fe_2O_3$, 0–4 wt. % of CuO, 0.1–6 wt. % of ZnO, 0–1.5 wt. % of $TiO_2$, and 0–5 wt. % of $F_2$.

10. A low temperature sealing composition as claimed in claim 1, wherein the wt. % of $GeO_2$ does not exceed 4.0.

11. A low temperature sealing composition as claimed in claim 3, wherein the wt. % of $GeO_2$ does not exceed 4.0.

12. A low temperature sealing composition as claimed in claim 5, wherein the wt. % of $GeO_2$ does not exceed 4.0.

13. A low temperature sealing composition as claimed in claim 7, wherein the wt. % of $GeO_2$ does not exceed 4.0.

14. A low temperature sealing composition as claimed in claim 8, wherein the wt. % of $GeO_2$ does not exceed 4.0.

15. A low temperature sealing composition as claimed in claim 9, wherein the wt. % of $GeO_2$ does not exceed 4.0.

* * * * *